(12) United States Patent
Joly et al.

(10) Patent No.: US 9,942,876 B2
(45) Date of Patent: Apr. 10, 2018

(54) METHOD FOR MANAGING SINGLE CHANNEL SPATIAL REUSE IN THE PRESENCE OF POTENTIALLY DISRUPTIVE NODES IN A MOBILE AD-HOC NETWORK

(71) Applicants: Antoine Joly, Gennevilliers (FR); Laurent Fachau, Gennevilliers (FR)

(72) Inventors: Antoine Joly, Gennevilliers (FR); Laurent Fachau, Gennevilliers (FR)

(73) Assignees: THALES, Courbevoie (FR); INDRA SISTEMAS S.A., Aranjuez (ES); ELEKTROBIT WIRELESS COMMUNICATIONS LTD, Oulu (FI); SELEX ES S.p.A., Rome (IT); SAAB AB, Jarfalla (SE); RADMOR S.A., Gdynia (PL)

( * ) Notice: Subject to any disclaimer, the term of this patent is extended or adjusted under 35 U.S.C. 154(b) by 232 days.

(21) Appl. No.: 14/718,721

(22) Filed: May 21, 2015

(65) Prior Publication Data

US 2015/0271680 A1 Sep. 24, 2015

Related U.S. Application Data

(63) Continuation of application No. 14/234,371, filed as application No. PCT/EP2012/064071 on Jul. 18, 2012, now abandoned.

(30) Foreign Application Priority Data

Jul. 22, 2011 (EP) ..................... 11290335

(51) Int. Cl.
| | |
|---|---|
| *H04W 84/18* | (2009.01) |
| *H04W 72/00* | (2009.01) |
| *H04W 72/04* | (2009.01) |
| *H04W 16/12* | (2009.01) |

(52) U.S. Cl.
CPC ........... *H04W 72/00* (2013.01); *H04W 72/04* (2013.01); *H04W 16/12* (2013.01); *H04W 72/0446* (2013.01); *H04W 84/18* (2013.01)

(58) Field of Classification Search
CPC . H04W 84/18; H04W 74/0816; H04W 74/00; H04W 74/04; H04W 72/0446;
(Continued)

(56) References Cited

U.S. PATENT DOCUMENTS

2011/0013601 A1\* 1/2011 Cerasa .................. H04W 28/26
370/336

FOREIGN PATENT DOCUMENTS

EP 2469929 A1 6/2012

OTHER PUBLICATIONS

Liping Zhou, et al., "A Hybrid MAC Protocol Based on ADAPT with Modified Back-Off Mechanism" Education Technology and Computer (ICETC), 2010, 2nd international conference on, Jun. 2010, pp. V4-143-V4-147, IEEE, Piscatawy, NJ, USA, XP031718408.

(Continued)

*Primary Examiner* — Jae Y Lee
*Assistant Examiner* — Aixa Guadalupe-Cruz
(74) *Attorney, Agent, or Firm* — Baker & Hostetler LLP

(57) ABSTRACT

A method is provided for managing the spatial reuse of slots in a mobile network comprising several nodes Ni, said network comprising one or more Potentially Disruptive Nodes (PDN), said nodes Ni and PDN comprising a local table, a global table, and a summary of the global table comprising the interleaving of two sub-cycles: a first sub-cycle, the normal S-cycle, where S-SLOTs are all assigned statically and where each node has one or only one S-SLOT allocation, a second sub-cycle, the improved S-cycle, where each node has one S-SLOT assigned statically, and where (Continued)

for all nodes except PDN nodes, one or more additional S-SLOTs is assigned dynamically when topology makes it possible, dynamic S-SLOT allocation being equitably shared in a 2-hop neighborhood, and determined by performing S-SLOT spatial reuse.

12 Claims, 5 Drawing Sheets

(58) Field of Classification Search
CPC . H04W 28/26; H04W 40/16; H04W 52/0216; H04L 2012/6456; H04L 2012/6459; H04L 45/122
See application file for complete search history.

(56) References Cited

OTHER PUBLICATIONS

Douglas M. Blough, et al., "The k-Neighbots Approach toInterference Bounded and Symmetric Topology Control in Ad Hoc Networks", IEEE Transcations on Mobile Computing, Sep. 2006, pp. 1267-1282, vol. 5, No. 9, XP-001546033.
K. Shashi Prabb, et al., "On Scheduling and Real-Time Capacity of Hexagonal Wireless Sensor Networks", 19th Euromicro Conference on Real-Time Systems, 2007, Computer Society, 10 pages, IEEE.
Qiong Sun, et al., "A Framework for Topology-Transparent Scheduling in Wireless Networks", 2010, 5 pages, IEEE.

* cited by examiner

| BUSY_RX | FREE | BUSY_TX | BUSY_RX | ... | JAMMED OR IN_COLLISION | LT |
|---------|------|---------|---------|-----|------------------------|----|
| 1 | 2 | 3 | 4 | | NMAX | |

S-SLOT number in the improved S-cycle →

FIG.3

Id of the 1-hop neighbours of the local node

| | | | | | | GT |
|---|---|---|---|---|---|---|
| 5  → | 1 | 0 | 0 | 1 | ... | 1 |
| 23 | 1 | 0 | 1 | 0 | ... | 0 |
| ... | ... | ... | ... | ... | ... | ... |
| 57 | 0 | 0 | 1 | 1 | ... | 1 |
| | 1 | 2 | 3 | 4 | | NMAX |

S-SLOT number in the improved S-cycle →

FIG.4

| 24 | 0 | 15 | 18 | ... | 4 | SGT |
|----|---|----|----|-----|---|-----|
| 1 | 2 | 3 | 4 | | NMAX | |

S-SLOT number in the improved S-cycle →

METHOD FOR MANAGING SINGLE CHANNEL SPATIAL REUSE IN THE PRESENCE OF POTENTIALLY DISRUPTIVE NODES IN A MOBILE AD-HOC NETWORK

CROSS-REFERENCE TO RELATED APPLICATIONS

This application is a continuation of U.S. patent application Ser. No. 14/234,371, which is a National Stage of International patent application PCT/EP2012/064071, filed on Jul. 18, 2012, which claims priority to foreign European patent application No. EP 11290335.6, filed on Jul. 22, 2011, the disclosures of which are incorporated by reference in their entirety.

FIELD OF THE INVENTION

The invention relates to a method for managing spatial reuse on a single channel in a mobile ad-hoc network comprising one or more potentially disruptive nodes.

A potentially disruptive node or PDN is defined as a node having a wide connectivity as explained below.

BACKGROUND

A mobile network, for example a MANET (Mobile Ad-hoc Network), is a kind of network that has the capability to reconfigure itself and change locations. Such network is composed of a plurality of moving communication nodes able to emit (transmit) and to receive data from each other. The term data means signalling or user traffic or any kind of traffic or data exchanged between the nodes.

In some cases, a mobile network uses a single radio channel, and data communications are usually transmitted in time slots, a time slot being defined by its transmission time and its duration.

A time slot used by a given node to transmit on a given radio channel can be reused in transmission on the same radio channel by other nodes if they are far away enough. Thus there is no interference.

Some nodes in a mobile network, known as potentially disruptive nodes, may have a negative impact on performances because of their wide connectivity compared to the one of the network average. This is notably due to good propagation conditions and/or a favourable location of the node among other nodes of the network.

One of the problems with such nodes is that they can reduce the amount of slot spatial reuse in a mobile network. Moreover, PDN nodes can become routing bottlenecks if they have to relay too much data. A definition of a PDN node is given in the application EP10290677.3.

The document of Liping Zhou titled "a hybrid MAC protocol based on ADAPT with modified back-off mechanism" EDUCATION TECHNOLOGY AND COMPUTER (ICETC), 2010, $2^{ND}$ international conference on, IEEE, PISCATAWY, N.J., USA, 22 Jun. 2010, pages V4-143, XPO31718408 describes a method for solve the problem pr lack of radio resources created by a PDN nodes.

Definition

Slot spatial reuse consists in reusing the same slot in transmission on the same channel by several nodes if they are far away enough and thus do not interfere. Invention may also be applied in case of frequency hopping channel.

The channel $C_0$ is used by all the nodes of the network to transmit in S-SLOTs.

S-SLOTs are used, for example, to transmit signalling or user traffic or any kind of traffic or data exchanged between the nodes. A data frame may also comprise other types of slots than S-SLOTs. S-SLOTs may have a fixed position or a random position inside a data frame. A S-cycle is composed of a given number of data frames as explained after in connexion with FIG. 2.

SUMMARY OF THE INVENTION

Present invention concerns a method for managing the spatial reuse of slots in a mobile network comprising several nodes Ni, said method comprising a first sub-cycle and a second sub-cycle, said network comprising one or more Potentially Disruptive Nodes (PDN), said nodes Ni and PDN comprising a local table LT, a global table GT indicating the possible reusability of S-SLOTs, and a summary of the global table SGT adapted to determine which S-SLOTs in the improved S-cycle can finally be reused by the local node, said method comprising the interleaving of said two sub-cycles:
  first sub-cycle, the normal S-cycle, where S-SLOTs are all assigned statically and where each node has one and only one S-SLOT allocation,
  second sub-cycle, the improved S-cycle, where each node has one S-SLOT assigned statically, and where for all nodes except PDN nodes, one or more additional S-SLOTs is assigned dynamically when topology makes it possible, dynamic S-SLOT allocations being equitably shared in a 2-hop neighbourhood, and determined by performing S-SLOT spatial reuse.

If two or more 1-hop neighbours announce their intentions to transmit in the same S-SLOT j, i.e. status BUSY_TX for S-SLOT j, the local node may detect in advance a logical collision in S-SLOT j. To prevent a physical collision to occur in S-SLOT j, the local node indicates, for example, in its local table LT that S-SLOT j is JAMMED_OR_IN_COLLISION.

Each local node can update its local table LT if it logically detects the resolution of a logical collision, in order to stop transmitting a JAMMED_OR_IN_COLLISION status:
  If a logical collision has been detected on S-SLOT j less than one S-cycle ago, the local node should check the following conditions:
    Among the 1-hop neighbours involved in the logical collision, if only one of them indicates in its local table a BUSY_TX status for S-SLOT j, the status of S-SLOT j should be set to BUSY_RX in the local table LT of the local node,
    Among the 1-hop neighbours involved in the logical collision, if zero of them indicate in its local table LT the BUSY_TX status for S-SLOT j, the status of S-SLOT j should be set to FREE in the local table of the local node,
    A non-PDN node transmits its current local table LT in each of its static S-SLOT allocations, and potentially in each of its dynamic slot allocations, if better interactivity and convergence times are desired.

As soon as a node has identified itself as a PDN node, for example, it stops transmitting its local table and release its potential dynamic S-SLOT allocations. A PDN node continues updating its local table LT, its global table GT and its summary of the local table SGT.

According to an embodiment, a non-PDN node transmits its current table in each of its static S-SLOT allocations, and if needed in each of its potential dynamic S-SLOT allocations in order to improve convergence times.

According to another embodiment, a S-SLOT can have one of the four possible statuses in the improved S-cycle:
BUSY_TX: The local node transmits in the S-SLOT;
FREE: The local node does not transmit in the S-SLOT and it does not detect enough activity in the S-SLOT;
BUSY_RX: The local node receives data properly, or it detects some activity in the S-SLOT even though it is not able to decode data properly;
JAMMED_OR_IN_COLLISION: The S-SLOT is jammed by an enemy or suffers collisions from the network itself.

The dynamic S-SLOT allocations mechanisms use, for example, among other variables, the number of 2-hop neighbours of the local node, in order to calculate the theoretical maximum number of dynamic S-SLOT allocations the local node can have. If the number of 2-hop neighbours is zero, the node tries to reuse all the dynamic S-SLOTs of the improved S-cycle.

The steps to build a local table of a local node are, for example, the following steps:
analysis of a local table transmitted by its 1-hop neighbours and received by the local node,
logical detection of a collision,
logical detection of a resolution of a logical collision,
physical detection of the FREE, BUSY_RX or JAMMED_OR_IN_COLLISION status,
BUSY_RX status for the static S-SLOT allocations of 1-hop neighbours.

The global table, which indicates the possible reusability of S-SLOTs in the improved S-cycle, is built, for example, by analyzing the local tables received from each 1-hop neighbour of the local node in the following way:
Let i represent the identity id of a 1-hop neighbour from which the local node has received a local table,
Let j designate the S-SLOT number in the improved S-cycle; $GT(i,j)$ can either be equal to 0 or 1,
$GT(i,j)=0$ means that S-SLOT j is potentially reusable by the local node, according to the local table transmitted by node i,
$GT(i,j)=1$ means that S-SLOT j is not reusable by the local node, according to the local table transmitted by node i,
If the local table received from a 1-hop neighbour i indicates that S-SLOT j is FREE, then $GT(i,j)=0$,
If the local table received from a 1-hop neighbour i indicates that S-SLOT j is BUSY_RX, BUSY_TX or JAMMED_OR_IN_COLLISION, then $GT(i,j)=1$.

According to an embodiment, to determine which S-SLOTs in the improved S-cycle can finally be reused by the local node, said process comprises the analysis of the global table:
Let i represent the id of a 1-hop neighbour from which the local node has received a local table. Let j designate the S-SLOT number in the improved S-cycle.
Let $$SGT(j) = \sum_{i} GT(i, j)$$

with $GT(i,j)$ can either be equal to 0 or 1, A reusable S-SLOT verifies the three following criteria:
$LT(j)=FREE$,
$SGT(j)=0$.

A back-off counter for S-SLOT j is, for example, equal to 0, back-off counter being a random integer between 0 and a given number.

The present invention concerns also a network for managing reuse in single channel condition in a mobile network comprising several nodes Ni, said network comprising one or several Potentially Disruptive Nodes (PDN), said nodes Ni and PDN comprising a local table LT, a global table GT and a summary of the global table SGT wherein the nodes of the network comprises means for executing at least the steps of method according to characteristics previously mentioned.

BRIEF DESCRIPTION OF THE DRAWINGS

Other objects, features and advantages of the present invention will become apparent from the detailed description of the invention which follows, when considered in light of the accompanying drawings in which:
FIG. 3, is an example of local table,
FIG. 4, is an example of a global table,
FIG. 5, is an example of summary of a global table.

DETAILED DESCRIPTION

Figure 1:
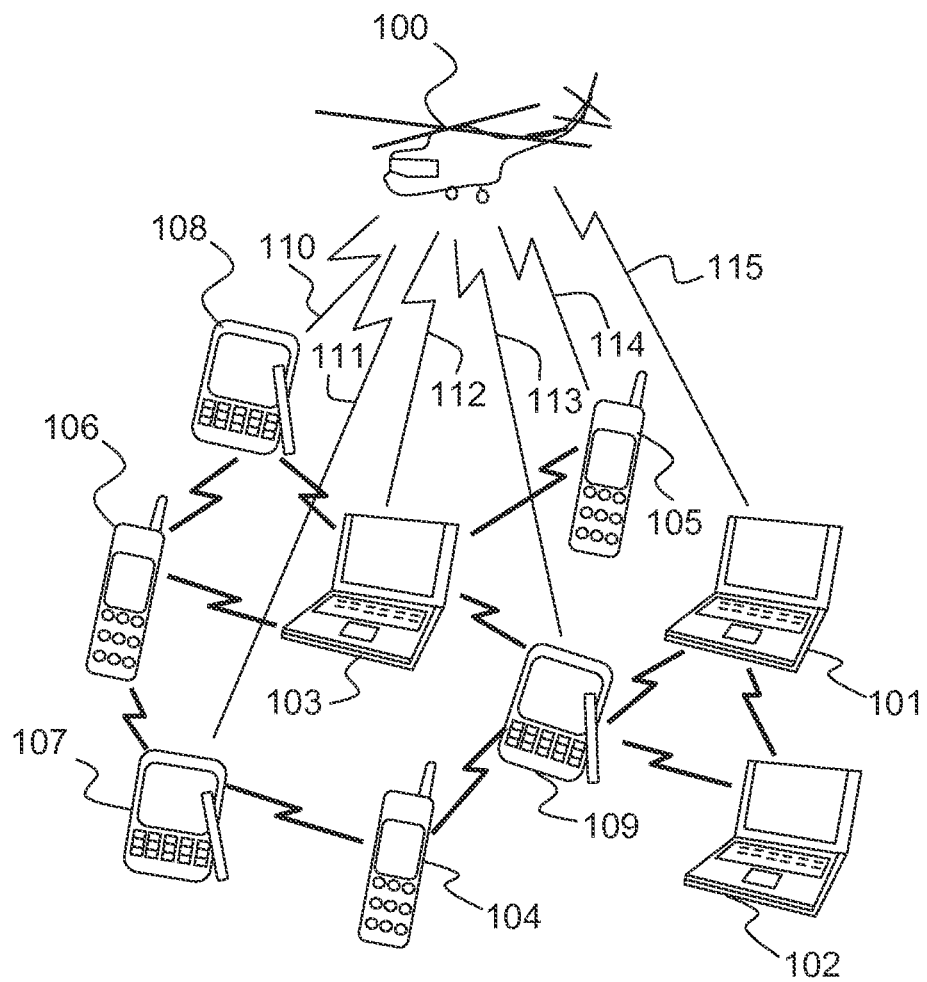
FIG. 1, is a schematic representation of a mobile ad-hoc network.
Figure 2:
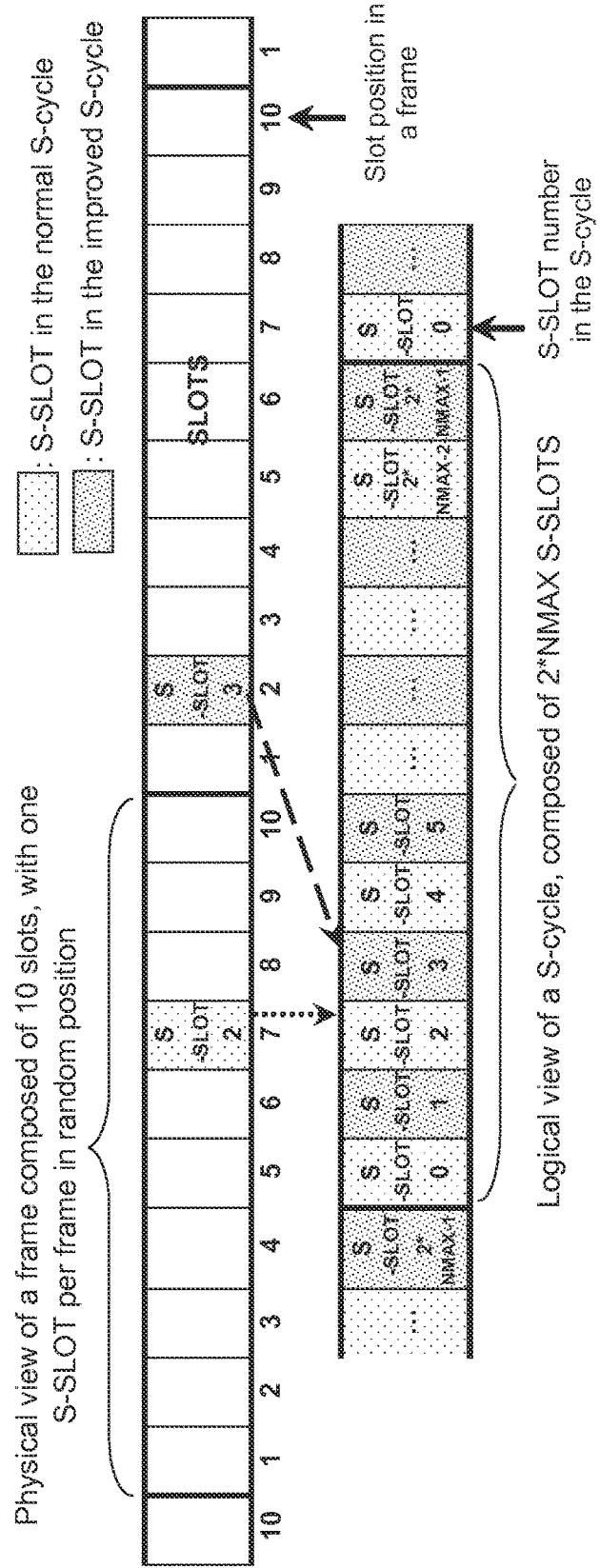
FIG. 2, is an example of normal and improved S-cycles.

FIG. 1 is a schematic representation of a mobile ad-hoc network comprising several radio communication nodes Ni. Some of them are potentially disruptive nodes (PDN) such as defined above.

The radio communication nodes are, for example, mobile phones 104, 105, 106, portable computers 101, 102, 103, electronic tablets 107, 108, 109, or aerial vehicle 100. More generally, a node is an equipment that comprises means of transmitting/receiving data on a selected radio channel to/from other nodes of the network, or other networks. The neighbouring nodes that can be reached directly without the use of another node are called one-hop or 1-hop neighbour nodes.

The method proposed according to the present invention is based on the use of static and dynamic S-SLOT allocation mechanisms. Proposed solution according to the invention uses a new concept of normal sub-cycle (normal S-cycle) and improved sub-cycle (improved S-cycle) allowing the PDN nodes to be managed. A node needs to know its 2-hop neighbourhood. Neighbours are discovered thanks to the S-SLOTs or other kinds of slots such as beacon slots.

Static allocations are determined, for example, according to the identity of nodes and have, as aim, to give at least one S-SLOT transmission opportunity to each node for each sub-cycle, whatever the topology of the network.

Dynamic allocations are determined by executing spatial reuse mechanisms and their aim is to allow nodes, except PDN nodes, to transmit more than once in the improved sub-cycle, when topology authorizes it.

The object of the present invention is also based on the use of both slot statuses tables exchanged between nodes, and physical information (provided by the physical layer and used by the MAC (Medium Access Control) layer), in order to improve the convergence time and the reactivity, in view of the mobility of the nodes.

In the example given in the following description, the S-cycle is composed of two sub-cycles, temporally interleaved:

Normal S-Cycle:

S-SLOTs are all assigned statically. S-SLOT spatial reuse is not allowed in the normal S-cycle. Each node has one and only one S-SLOT allocation in the normal S-cycle.

Improved S-Cycle:

Each node has one S-SLOT assigned statically, plus, for all nodes except PDNs, one or more additional S-SLOTs assigned dynamically when S-SLOT spatial reuse is possible.

Definitions and concept being given, embodiments of the invention will now be described.

Normal and Improved S-Cycles

In this example, as previously introduced, the S-cycle is composed of two sub-cycles, temporally interleaved:

a) first sub-cycle or Normal S-cycle: S-SLOTs are all assigned statically. S-SLOT spatial reuse is not allowed in the normal S-cycle. Each node has one and only one S-SLOT allocation.

b) second sub-cycle or Improved S-cycle: each node has one S-SLOT assigned statically, plus, for all nodes except PDNs, one or more additional S-SLOTs assigned dynamically when S-SLOT spatial reuse is possible.

The interleaving may be, for example, constituted of 50% of S-SLOTs in the normal S-cycle and 50% of S-SLOTs in the improved S-cycle, or any other values, a % for S-SLOTs in the normal S-cycle and b % of S-SLOTs in the improved S-cycle, the sum a+b being equal to 100%.

A PDN is not allowed to perform S-SLOT spatial reuse due to its large number of neighbours.

A PDN reduces the amount of S-SLOT spatial reuse that could take place in the network if this PDN was not present, for the following reasons:

each time a PDN transmits, none of its 1-hop neighbours can transmit in the same S-SLOT. Otherwise, one (or more) 1-hop neighbour(s) of the PDN would be interfered.

when a 1-hop neighbour of a PDN transmits, neither the PDN nor its 1-hop neighbours can transmit in the same S-SLOT. Otherwise, the PDN would be interfered.

As soon as a node has identified itself as a PDN, it stops performing reuse and it is not taken into account by its 1-hop neighbours to determine their potential reusable S-SLOTs. This solution allows performing reuse in the improved S-cycle as if there were no PDN in the network (i.e. the PDN node's neighbourhood is not taken into account when performing the S-SLOT spatial reuse).

A PDN may suffer collisions on the S-SLOTs in the improved S-cycle that are reused. These S-SLOTs may not be properly received (decoded) by the PDN. This is why the normal S-cycle exists.

As S-SLOT spatial reuse is not allowed for each PDN node in the normal S-cycle and as S-SLOTs are all assigned statically, collisions cannot occur and each PDN receives all S-SLOTs properly in the normal S-cycle.

The normal S-cycle is defined as NMAX occurrences of S-SLOTs, with an even S-SLOT number for example in the S-cycle (S-SLOTs 0, 2, 4, . . . , 2*NMAX−2), where NMAX corresponds to the maximum number of nodes allowed in the network.

The improved S-cycle is defined as NMAX occurrences of S-SLOTs, with an odd S-SLOT number for example in the S-cycle (S-SLOTs 1, 3, . . . , 2*NMAX−1) according to a repartition of 50% of S-SLOTs in the normal S-cycle and 50% of S-SLOTs in the improved S-cycle.

Now the static S-SLOT allocation will be described. Each node has one static S-SLOT allocation in the normal S-cycle and one static S-SLOT allocation in the improved S-cycle.

Transmission: the local node transmits during its static S-SLOT allocation in the normal S-cycle and in the improved S-cycle, Reception: The local node is in a receiving state during all the S-SLOTs of the normal and improved S-cycles, except its own two static S-SLOT allocations.

Then the dynamic S-SLOT allocation will be presented. The aim of the dynamic S-SLOT allocation mechanisms is to perform S-SLOT spatial reuse, when topology makes it possible, and to allow nodes, except PDNs, to transmit more than once in the improved S-cycle.

Dynamic S-SLOT allocations are equitably shared in a 2-hop neighbourhood.

A PDN is not allowed to perform S-SLOT spatial reuse due to its large number of neighbours.

A PDN reduces the amount of S-SLOT spatial reuse that could take place in the network if this PDN was not present. As soon as a node has identified itself as a PDN, it stops performing reuse and it is not taken into account by its 1-hop neighbours to determine their potential reusable S-SLOTs. This solution allows to do reuse in the improved S-cycle as if there were no PDN in the network (i.e. the PDN node's neighbourhood is not taken into account when performing the S-SLOT spatial reuse).

The dynamic S-SLOT allocation mechanisms are single channel mechanisms. One channel, $C_0$, is used by all the nodes of the network to transmit in S-SLOTs.

In order to execute the different mechanisms previously described, the nodes of the network according to the present invention must maintain tables that will now be described.

Each node maintains a local table LT, a global table GT and a summary of the global table SGT.

Local Table LT

The local table describes the status of the NMAX S-SLOTs of the improved S-cycle, from the local node point of view. An example is given on FIG. 3.

Let j designate the S-SLOT number in the improved S-cycle. Let LT(j) represent the status of S-SLOT j.

The possible status of an S-SLOT in the improved S-cycle is for example one of the four following statuses:

BUSY_TX: The local node transmits in the S-SLOT;

FREE: The local node does not transmit in the S-SLOT and it does not detect enough activity in the S-SLOT;

BUSY_RX: The local node receives data properly, or it detects some activity in the S-SLOT even though it is not able to decode data properly;

JAMMED_OR_IN_COLLISION: The S-SLOT is jammed by an enemy or suffers a collision from the network itself.

One embodiment to build the local table LT comprises for example the following steps:

analyzing the local tables transmitted by its 1-hop neighbours and received by the local node;

analyzing the metrics provided by the physical (PHY) layer when the local node is listening to a S-SLOT;

taking into account the static S-SLOT allocation of its 1-hop neighbours in the improved S-cycle;

taking into account the static S-SLOT allocation of the local node, and its potential dynamic S-SLOT allocation(s).

More generally an example of steps to construct a local table is for example performed in the following order:

Logical analysis of a local table received by the local node,

Logical detection of a collision,
Logical detection of a resolution of a logical collision,
Physical detection of the three statuses FREE, BUSY_RX or JAMMED_OR_IN_COLLISION,
BUSY_RX status for the static S-SLOT allocations of 1-hop neighbours.

A non-PDN node transmits its current local table LT in each of its static S-SLOT allocations, and potentially in each of its dynamic S-SLOT allocations, if better interactivity and convergence times are desired.

A PDN node does not transmit its local table because a PDN is not allowed to perform S-SLOT spatial reuse, and it is useless for a PDN to transmit its local table because the latter should not be taken into account by its 1-hop neighbours.

This solution allows non-PDN nodes to perform S-SLOT spatial reuse in the improved S-cycle as if there were no PDN in the network (i.e. the PDN node's neighbourhood is not taken into account when performing the S-SLOT spatial reuse).

When a node is switched on, the S-SLOT corresponding to the static allocation of the local node in the improved S-cycle always has a BUSY_TX status, and all the other S-SLOTs have by default the FREE status.

Figure 6:
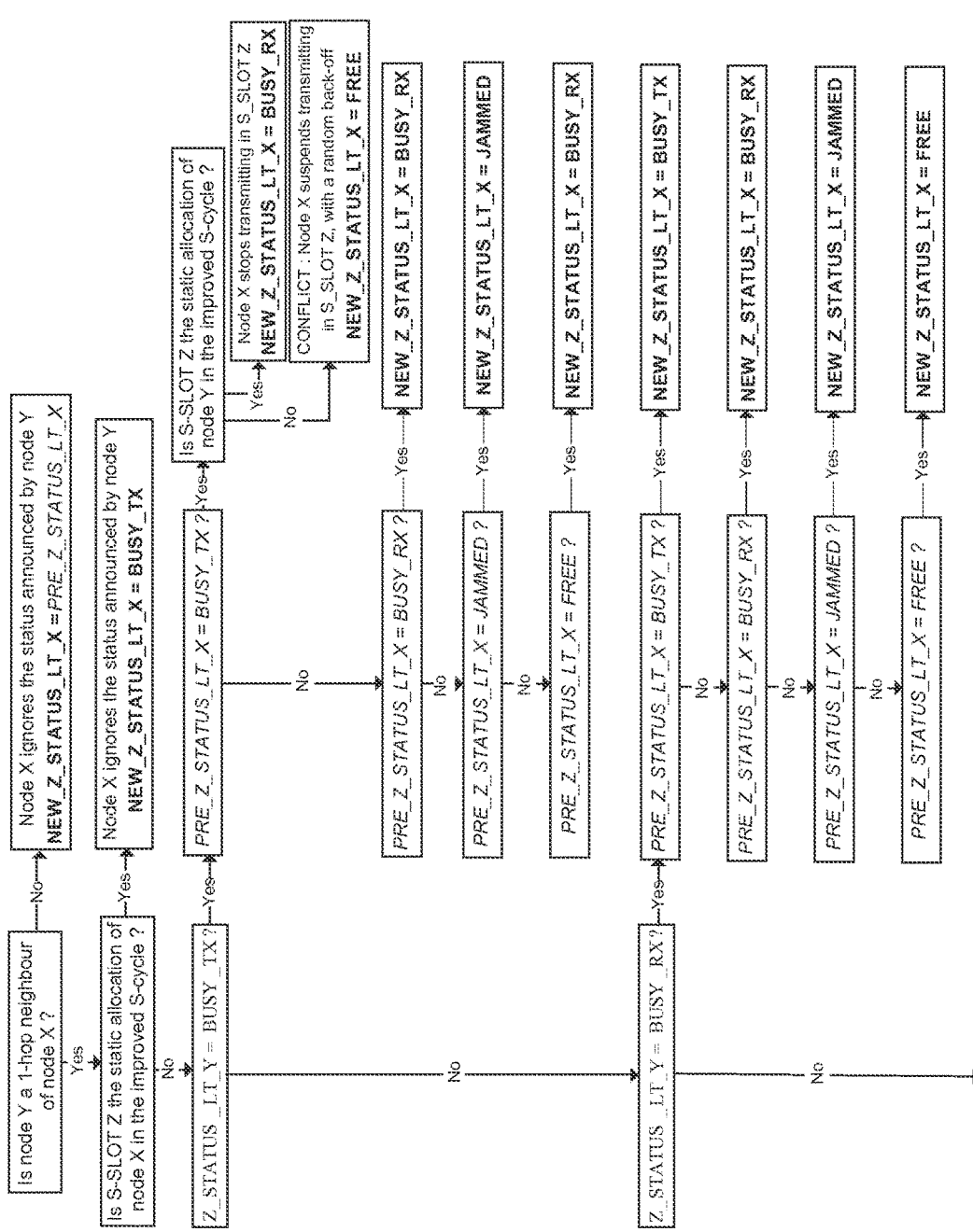
FIG. 6, is a diagram used to determine the new status of a S-SLOT in the local table of a local node, after the local node has received a local table transmitted by another node.
Figure 6:
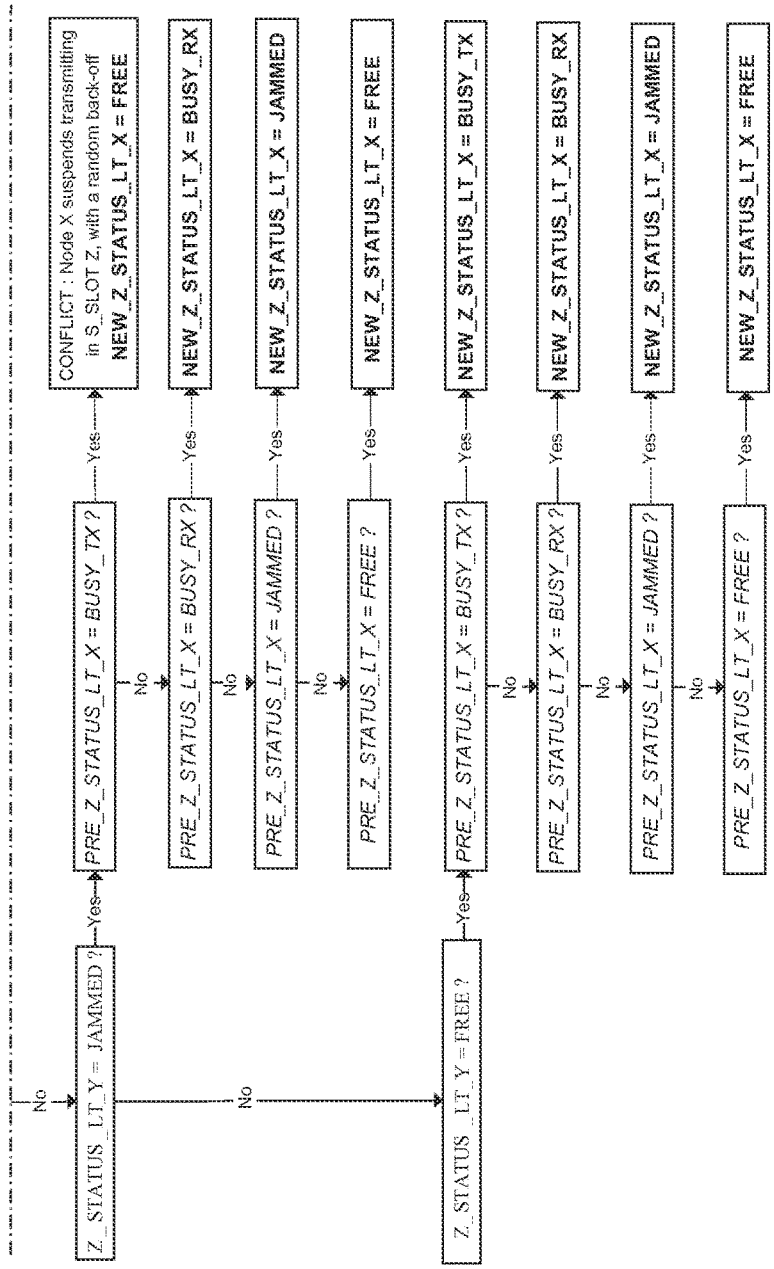

FIG. 6 describes an example of analysis of a local table received by the local node.

Global Table GT

A node also has a global table which is, for example, in the form of a matrix. The aim of this global table is to indicate the possible reusability of S-SLOTs in the improved S-cycle, notably by analyzing the local tables received from each 1-hop neighbour of the local node. An example is given on FIG. 4.

Let i represent the identity Id of a 1-hop neighbour from which the local node has received a local table.

Let j designate the S-SLOT number in the improved S-cycle. GT(i,j) can either be equal to 0 or 1.

GT(i,j)=0 means that S-SLOT j is potentially reusable by the local node, according to the local table transmitted by node i.

GT(i,j)=1 means that S-SLOT j is not reusable by the local node, according to the local table transmitted by node i.

If the local table received from a 1-hop neighbour i indicates that S-SLOT j is FREE, then GT(i,j)=0.

If the local table received from a 1-hop neighbour i indicates that S-SLOT j is BUSY_RX, BUSY_TX or JAMMED_OR_IN_COLLISION, then GT(i,j)=1.

The entry in the global table corresponding to the local table sent by a 1-hop neighbour should be saved until a new local table is received from this neighbour.

The global table received from a {NON} 1-hop neighbour should be discarded. The expression {NON} 1-hop neighbour means that the node is not a "1-hop neighbour".

If a 1-hop neighbour becomes a {NON} 1-hop neighbour, its corresponding entry in the global table should be deleted.

As soon as a 1-hop neighbour becomes a PDN, its corresponding entry in the global table should be deleted.

Summary of the Global Table SGT

As introduced previously, a node also has a summary of the global table SGT; an example is given on FIG. 5.

The aim of the summary of the global table SGT is to determine which S-SLOTs in the improved S-cycle can finally be reused by the local node.

Let i represent the id of a 1-hop neighbour from which the local node has received a local table; let j designate the S-SLOT number in the improved S-cycle;

Let $$SGT(j) = \sum_i GT(i, j)$$

The summary of the global table is updated after each update of the global table.

A back-off counter can be created for a S-SLOT j if:
one of the two cases of conflict described in the diagram of logical analysis of a local table is met,
or the status JAMMED_OR_IN_COLLISION is detected physically (using PHY metrics, as defined after).

The aim of the back-off counter is to avoid that the local node tries to reuse, at the next S-cycle or at the same time as a 1-hop neighbour, a S-SLOT that just suffered a conflict or a jamming.

The back-off counter is a random integer between 0 and a given number. It is, for example, decremented by 1 at the beginning of each S-cycle, till it reaches 0. If the back-off counter for S-SLOT is not equal to 0, this S-SLOT cannot be reused by the local node.

A reusable S-SLOT j respects, for example, the three following criteria:
LT(j)=FREE,
SGT(j)=0,
The back-off counter for S-SLOT j is equal to 0.

If SGT(j)=0, this means that S-SLOT j is FREE for all the 1-hop neighbours of the local node.

In the example of FIG. 5, if the back-off counter for S-SLOT #2 is equal to 0, this S-SLOT is reusable by the local node because LT(2)=FREE (cf. FIG. 3) and SGT(2)=0 (see FIG. 5).

FIG. 6 gives an example of logical analysis of a local table received by the local node. When the local node X in this example receives a local table LT transmitted by a node Y, the new status of S-SLOT Z in the local table should be determined according, for example, to the diagram of FIG. 6 where:
Z_STATUS_LT_Y: Status of S-SLOT Z announced by a node Y in its local table.
PRE_Z_STATUS_LT_X: Previous status of S-SLOT Z in the local table of the local node (node X), before logical analysis of the local table transmitted by node Y.
NEW_Z_STATUS_LT_X: New status of S-SLOT Z in the local table of the local node (node X), after logical analysis of the local table transmitted by node Y. In this diagram, the word <<JAMMED>> is used to designate <<JAMMED_OR_IN_COLLISION>>.

The logical detection of a collision may be realized in the following way; the status of S-SLOT j should be set to JAMMED_OR_IN_COLLISION in the local table LT of the local node when two or more 1-hop neighbours indicate in their local table the BUSY_TX status for S-SLOT j.

If two or more 1-hop neighbours announce their intentions to transmit in the same S-SLOT j, the local node detects in advance a logical collision in S-SLOT j. To prevent a physical collision to occur in S-SLOT j, the local node indicates in its local table that S-SLOT j is JAMMED_OR_IN_COLLISION.

Logical Detection of a Resolution of a Logical Collision

If a logical collision was detected on S-SLOT j less than one S-cycle ago, the local node can check the following conditions:
Among the 1-hop neighbours involved in the logical collision, if only one of them indicates in its local table the BUSY_TX status for S-SLOT j, the status of S-SLOT j can be set to BUSY_RX in the local table of the local node.

Among the 1-hop neighbours involved in the logical collision, if zero of them indicates in its local table the BUSY_TX status for S-SLOT j, the status of S-SLOT j can be set to FREE in the local table of the local node.

It is useful that the local node updates its local table if it logically detects the resolution of a logical collision, in order to stop transmitting the JAMMED_OR_IN_COLLISION status while there is no logical collision anymore. The terms "less than one S-cycle ago" are useful because, if the logical collision is not solved logically before S-SLOT j occurs, it will be analyzed physically (i.e. using the PHY metrics), when the local node listens to S-SLOT j.

According to the invention, the state of the radio channel can be analyzed using metrics provided by the PHY layer. When the local node (node X) is listening to S-SLOT Z in the improved S-cycle, the new status of S-SLOT Z in the local table of the local node should be determined. The three possible statuses are:
- FREE: the local node does not detect enough activity in the S-SLOT.
- BUSY_RX: the local node receives data properly, or it detects some activity in the S-SLOT even though it is not able to decode data properly.
- JAMMED_OR_IN_COLLISION: the S-SLOT is jammed by an enemy or suffers collisions from the network itself.

According to an embodiment of the invention, the maximum number MAX_DYN of dynamic S-SLOT allocations obtainable by a non-PDN node is chosen according to the 2-hop neighbourhood of the local node. Dynamic S-SLOT allocations are equitably shared in a 2-hop neighbourhood; Let L_USED_DYN a list of the dynamic S-SLOT allocations of the local node and S_L_USED_DYN designates the size of the L_USED_DYN list.

Proper Number of Dynamic S-SLOT Allocations: S_L_USED_DYN=MAX_DYN

If a non-PDN node has the theoretical number of dynamic S-SLOT allocations, it does not need to release or gain allocations.

Release of Dynamic S-SLOT Allocations for a Non-PDN Node: S_L_USED_DYN>MAX_DYN

If a non-PDN node has more dynamic S-SLOT allocations than the maximum number, it has to release R=S_L_USED_DYN−MAX_DYN allocation(s).

The R dynamic S-SLOT allocation(s) to release can either be:
- randomly chosen in the L_USED_DYN list,
- chosen in the L_USED_DYN list so that the two static S-SLOT allocations and the potentially remaining dynamic S-SLOT allocation(s) are as uniformly distributed as possible in the S-cycle.

Released S-SLOT—BUSY_TX to FREE Status

The local table LT of the local node is updated to take into account the status of the released S-SLOT(s). The status of a released S-SLOT is set from BUSY_TX to FREE in the local table of the local node.

Let L_AVAIL_DYN the list of the reusable S-SLOTs j that fulfils the three following criteria:
LT(j)=FREE,
SGT(j)=0,
the back-off counter for S-SLOT j is equal to 0.

Let S_L_AVAIL_DYN the size of the L_AVAIL_DYN list.

Gain of Dynamic S-SLOT Allocations for a Non-PDN Node: S_L_USED_DYN<MAX_DYN

If a non-PDN node has less dynamic S-SLOT allocations than the maximum number, it has to gain G allocation(s):
If    S_L_AVAIL_DYN≤MAX_DYN−S_L_USED_DYN, G=S_L_AVAIL_DYN,
If    S_L_AVAIL_DYN>MAX_DYN−S_L_USED_DYN, G=MAX_DYN−S_L_USED_DYN.

The G dynamic S-SLOT allocation(s) to gain can either be:
- randomly chosen in the L_AVAIL_DYN list,
- chosen in the L_AVAIL_DYN list so that the static S-SLOT allocations and the dynamic S-SLOT allocation(s) are as uniformly distributed as possible in the S-cycle.

Gained S-SLOT—FREE to BUSY_TX Status

The local table LT of the local node is updated to take into account the status of the gained S-SLOT(s). The status of a gained S-SLOT is set from FREE to BUSY_TX in the local table of the local node.

Without departing of the scope of the invention, it is possible to apply:
- both the physical and logical parts of the algorithms described previously,
- or only the logical part,
- or only the physical part.

If Only the Logical Part of the Algorithms is Applied:

All the dynamic reuse requirements should be applied except: the step "Physical detection of the FREE, BUSY_RX or JAMMED_OR_IN_COLLISION status" in the construction of the Local Table.

If Only the Physical Part of the Algorithms is Applied:

The following requirements should still be applied:
- the BUSY_TX status for the static S-SLOT allocations of the local node, i.e. when a node is switched on, the S-SLOT corresponding to the static allocation of the local node in the improved S-cycle always has a BUSY_TX status, and all the other S-SLOTs have by default the FREE status."
- the BUSY_RX status for the static S-SLOT allocations of 1-hop neighbours (concept of priority of static S-SLOTs),
- the construction of the global table, for example:
  - 1-hop neighbours,
  - Memorisation,
  - Local table received from a {NON} 1-hop neighbour,
  - 1-hop neighbour becoming {NON} 1-hop neighbour,
  - 1-hop neighbour becoming PDN,
- the Back-off counter, the proper number of dynamic S-SLOT allocations; the release of dynamic S-SLOT allocations for a non-PDN node; the released S-SLOT—BUSY_TX to FREE status; the construction of the summary of the global table; the gain of dynamic S-SLOT allocations for a non-PDN node; the gained S-SLOT—FREE to BUSY_TX status.
- only the physical part of the requirement on the back-off counter should be applied.

Advantages

Method and network according to the present invention offer notably the following advantages:
- Minimizing the impact of PDN nodes in the performances of a mobile network;
- Using the logical and physical information in order to improve convergence time and reactive time, in view of the mobility of the nodes of network.

The invention claimed is:
1. A method for managing a spatial reuse of slots in a mobile network comprising several nodes Ni, comprising a first sub-cycle and a second sub-cycle, said network comprising one or more Potentially Disruptive Nodes (PDN), said PDN having a wide connectivity compared to a mobile network average, said nodes Ni and PDN comprising a local table LT indicating a state of the slot locally, a global table GT indicating a possible reusability of S-SLOTs, the S-SLOTs being defined as a slot configured to transmit signalling or user traffic exchanged between the nodes and a summary of the global table SGT adapted to determine which S-SLOTs in said second sub-cycle can finally be reused by a local node, each node comprising a radio communication device configured to exchange information with the other nodes, said method comprising an interleaving of said two sub-cycles:

implementing the first sub-cycle with the radio communication device, a normal S-cycle, where the S-SLOTs are all assigned statically and where each node has one and only one S-SLOT allocation, implementing the second sub-cycle with the radio communication device, an improved S-cycle, where each node has one S-SLOT assigned statically, and where for all nodes except the PDN nodes, one or more additional S-SLOTs are assigned dynamically when topology makes it possible, dynamic S-SLOT allocations being equitably shared in a 2-hop neighbourhood, and wherein the dynamic S-SLOT allocations are determined by performing S-SLOT spatial reuse, and utilizing a back-off counter to avoid the local node trying to reuse at a next S-cycle or at a same time as a 1-hop neighbour, a S-SLOT that just suffered a conflict or a jamming.

2. The method according to claim 1, wherein if two or more 1-hop neighbours announce their intentions to transmit in the same S-SLOT j, i.e. status BUSY_TX for S-SLOT j, the local node detects in advance a logical collision in S-SLOT j and to prevent a physical collision to occur in S-SLOT j, the local node indicates in its local table LT that S-SLOT j is JAMMED_OR_IN_COLLISION.

3. The method according to claim 1 wherein each local node updates its local table LT if it logically detects the resolution of a logical collision, in order to stop transmitting a JAMMED_OR_IN_COLLISION status; and if a logical collision has been detected on S-SLOT j less than one S-cycle ago, the local node shall check the following conditions:

among the 1-hop neighbours involved in the logical collision, if only one of them indicates in its local table a BUSY_TX status for S-SLOT j, the status of S-SLOT j shall be set to BUSY_RX in the local table LT of the local node, among the 1-hop neighbours involved in the logical collision, if zero of them indicates in its local table LT the BUSY_TX status for S-SLOT j, the status of S-SLOT j shall be set to FREE in the local table of the local node.

4. The method according to claim 1, wherein as soon as a node has identified itself as a PDN node, it stops transmitting its local table and release its potential dynamic S-SLOT allocations, PDN node continues updating its local table LT, its global table GT and summary of the global table SGT.

5. The method according to claim 1 wherein a non-PDN node transmits its current table in each of its static S-SLOT allocations, and if needed in each of its potential dynamic S-SLOT allocations in order to improve convergence times.

6. The method according to claim 1 wherein in the improved S-cycle a S-SLOT has one of the four possible statuses:

BUSY_TX: the local node transmits in the S-SLOT;

FREE: the local node does not transmit in the S-SLOT and it does not detect enough activity in the S-SLOT;

BUSY_RX: the local node receives data properly, or it detects some activity in the S-SLOT even though it is not able to decode data properly;

JAMMED_OR_IN_COLLISION: the S-SLOT is jammed by an enemy or suffers collisions from the network itself.

7. The method according to claim 1 wherein the dynamic S-SLOT allocations mechanisms use, among other variables, the number of 2-hop neighbours of the local node, in order to calculate the maximum number of dynamic S-SLOT allocations the local node can have and if the number of 2-hop neighbours is zero, the node tries to reuse all the dynamic S-SLOTs of the improved S-cycle.

8. The method according to claim 1 wherein the steps to build a local table of a local node are:

analysis of a local table transmitted by its 1-hop neighbours and received by said local node, logical detection of a collision, logical detection of a resolution of a logical collision, Physical detection of the FREE, BUSY_RX or JAMMED_OR_IN_COLLISION status, BUSY_RX status for the static S-SLOT allocations of 1-hop neighbours.

9. The method according to claim 1 wherein the global table, which indicates the possible reusability of S-SLOTs in the improved S-cycle, is built by analyzing the local tables received from each 1-hop neighbour of the local node in the following way:

Let i represent the identity id of a 1-hop neighbour from which the local node has received a local table, Let j designate the S-SLOT number in the improved S-cycle, GT(i,j) being equal to 0 or 1, If the local table received from a 1-hop neighbour i indicates that S-SLOT j is FREE, then GT(i,j)=0, If the local table received from a 1-hop neighbour i indicates that S-SLOT j is BUSY_RX, BUSY_TX or JAMMED_OR_IN_COLLISION, then GT(i,j)=1.

10. The method according to claim 1 wherein to determine which S-SLOTs in the improved S-cycle can finally be reused by the local node it comprises the construction of the summary global table SGT:

Let i represent the id of a 1-hop neighbour from which the local node has received a local table, Let j designate the S-SLOT number in the improved S-cycle, $$SGT(j) = \sum_i GT(i, j)$$

GT(i,j) being equal to 0 or 1 and then a reusable S-SLOT verifies the following criteria:

LT(j)=FREE,

SGT(j)=0.

11. The method according to claim 10 wherein the back-off counter for S-SLOT j is equal to 0, back-off counter being a random integer between 0 and a given number.

12. A network for managing reuse in single channel condition in a mobile network comprising several nodes Ni, said network comprising one or more Potentially Disruptive Nodes (PDN), said nodes Ni and PDN comprising a local table LT, a global table GT, and a summary of the global table SGT wherein at least the nodes Ni of the network comprising a radio communication device configured to execute at least the steps of method according to claim 1.

* * * * *